US012606085B2

(12) United States Patent
Kim

(10) Patent No.: US 12,606,085 B2
(45) Date of Patent: Apr. 21, 2026

(54) VEHICLE AND CONTROL METHOD FOR GENERATING A VIRTUAL DRIVING SOUND

(71) Applicants: HYUNDAI MOTOR COMPANY, Seoul (KR); KIA CORPORATION, Seoul (KR)

(72) Inventor: Dongjin Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 85 days.

(21) Appl. No.: 18/510,263

(22) Filed: Nov. 15, 2023

(65) Prior Publication Data

US 2024/0326688 A1      Oct. 3, 2024

(30) Foreign Application Priority Data

Mar. 30, 2023      (KR) ........................ 10-2023-0042077

(51) Int. Cl.
*B60Q 5/00*      (2006.01)
*H04S 7/00*      (2006.01)
(52) U.S. Cl.
CPC .............. *B60Q 5/008* (2013.01); *H04S 7/302* (2013.01); *H04S 7/305* (2013.01)
(58) Field of Classification Search
None
See application file for complete search history.

(56) References Cited

U.S. PATENT DOCUMENTS

| | | | | |
|---|---|---|---|---|
| 2016/0101726 A1* | 4/2016 | Chang | .................... | G10K 15/02 |
| | | | | 381/86 |
| 2020/0184946 A1* | 6/2020 | Jung | ....................... | B60Q 5/008 |
| 2020/0198536 A1* | 6/2020 | Krammer | ............... | G10K 15/02 |
| 2020/0314542 A1* | 10/2020 | Chiang | ................... | A61B 5/123 |
| 2021/0407295 A1* | 12/2021 | Chang | ................... | G06V 40/174 |
| 2021/0407491 A1* | 12/2021 | Chang | ....................... | G06T 9/00 |
| 2021/0407492 A1* | 12/2021 | Chang | .................... | G10K 15/02 |
| 2022/0254326 A1* | 8/2022 | Kim | .................... | G10K 11/162 |
| 2022/0269474 A1* | 8/2022 | Chang | .................... | G06F 3/165 |

FOREIGN PATENT DOCUMENTS

| | | | | | |
|---|---|---|---|---|---|
| CN | 104215864 A | * | 12/2014 | | |
| CN | 109900354 A | * | 6/2019 | | |
| CN | 112124011 A | * | 12/2020 | ......... | B60C 23/0469 |

* cited by examiner

*Primary Examiner* — Fekadeselassie Girma
(74) *Attorney, Agent, or Firm* — Lempia Summerfield Katz LLC

(57)      ABSTRACT

A vehicle and a control method are for generating a virtual driving sound. The control method for the vehicle may include: receiving a radio signal including a sound source through an antenna of the vehicle; extracting the sound source from the received radio signal; generating a virtual driving sound representing a driving state of the vehicle based on the extracted sound source; and outputting the virtual driving sound to an interior or an exterior of the vehicle.

19 Claims, 10 Drawing Sheets

| OFF | SOUND SOURCE DATA | OFF | SOUND SOURCE DATA |
|---|---|---|---|

302 : CONFIGURATION OF
BROADCAST/COMMUNICATION SIGNAL

| OFF | HEADER | SOUND SOURCE DATA | OFF | HEADER | SOUND SOURCE DATA |
|---|---|---|---|---|---|

304 : ANOTHER CONFIGURATION OF
BROADCAST/COMMUNICATION SIGNAL

FIG.4

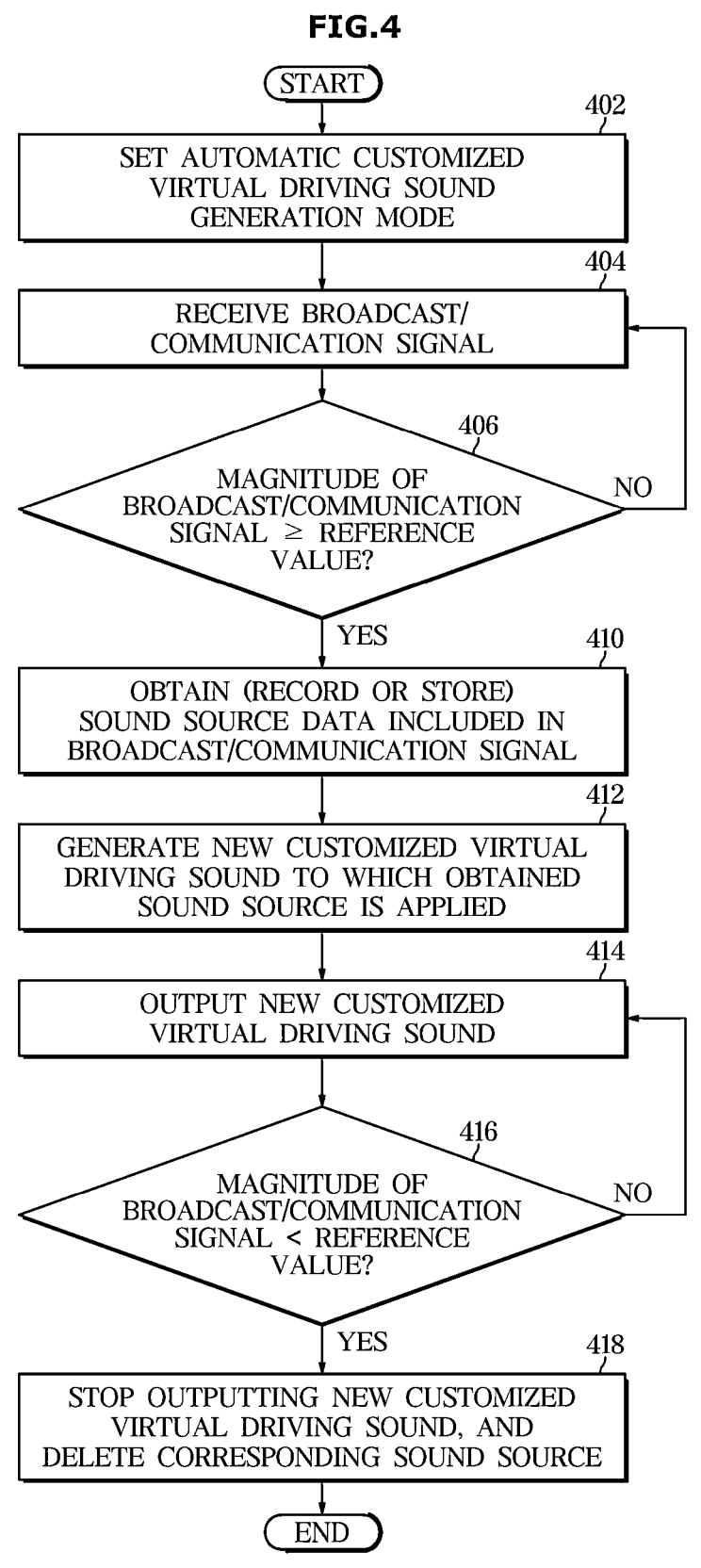

START

SET AUTOMATIC CUSTOMIZED
VIRTUAL DRIVING SOUND
GENERATION MODE — 402

RECEIVE BROADCAST/
COMMUNICATION SIGNAL — 404

MAGNITUDE OF
BROADCAST/COMMUNICATION
SIGNAL ≥ REFERENCE
VALUE? — 406 — NO

YES

OBTAIN (RECORD OR STORE)
SOUND SOURCE DATA INCLUDED IN
BROADCAST/COMMUNICATION SIGNAL — 410

GENERATE NEW CUSTOMIZED VIRTUAL
DRIVING SOUND TO WHICH OBTAINED
SOUND SOURCE IS APPLIED — 412

OUTPUT NEW CUSTOMIZED
VIRTUAL DRIVING SOUND — 414

MAGNITUDE OF
BROADCAST/COMMUNICATION
SIGNAL < REFERENCE
VALUE? — 416 — NO

YES

STOP OUTPUTTING NEW CUSTOMIZED
VIRTUAL DRIVING SOUND, AND
DELETE CORRESPONDING SOUND SOURCE — 418

END

214

AUTOMATIC CUSTOMIZED VIRTUAL
DRIVING SOUND GENERATION MODE
HAS BEEN SELECTED

DO YOU WANT AUTOMATIC GENERATION
OF CUSTOMIZED VIRTUAL DRIVING SOUND
BASED ON RECEIVED SOUND SOURCE?

YES          NO 502          504

Figure 6:
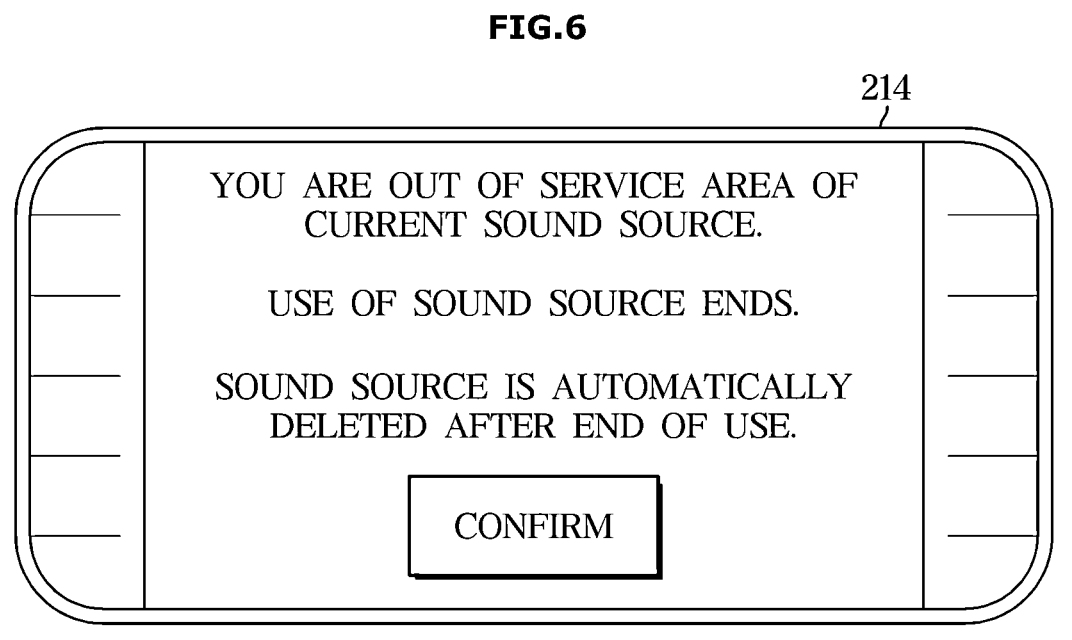

YOU ARE OUT OF SERVICE AREA OF
CURRENT SOUND SOURCE.

USE OF SOUND SOURCE ENDS.

SOUND SOURCE IS AUTOMATICALLY
DELETED AFTER END OF USE.

CONFIRM

214

NEW  VIRTUAL  DRIVING  SOUND
INFORMATION  RECEIVED.

SOUND  SOURCE :
GAYAGEUM  PERFORMANCE

DO  YOU  WANT  TO
APPLY  IT  TO  VEHICLE?

YES

NO

1002

1004

VEHICLE AND CONTROL METHOD FOR GENERATING A VIRTUAL DRIVING SOUND

CROSS-REFERENCE TO RELATED APPLICATION

This application is based on and claims priority under 35 U.S.C. § 119 to Korean Patent Application No. 10-2023-0042077, filed on Mar. 30, 2023 in the Korean Intellectual Property Office, the entire disclosure of which is incorporated herein by reference.

TECHNICAL FIELD

The disclosure relates to a vehicle, and more specifically, to generation and output of a virtual driving sound of a vehicle.

BACKGROUND

The statements in this section merely provide background information related to the present disclosure and may not constitute prior art. Active sound design (ASD) or electric vehicle active sound design (e-ASD) generates a new virtual driving sound by matching driving information or driving state information with a separate sound source. ASD or e-ASD outputs the generated virtual driving sound to an interior of a vehicle to allow a driver to experience dynamics or the fun of driving. ASD or e-ASD alternatively or also outputs the generated virtual driving sound to an exterior of the vehicle to allow a pedestrian to recognize a presence of the vehicle through the ASD sound.

ASD is generally applied to vehicles with internal combustion engines. With ASD, an internal combustion engine sound may be added to a virtual sound generated (artificially created) by ASD to create a variety of engine sounds (virtual driving sounds).

Further, e-ASD is applied to eco-friendly vehicles such as electric vehicles powered solely by a motor without an internal combustion engine. Because eco-friendly vehicles do not have an internal combustion engine, such eco-friendly vehicles do not generate an internal combustion engine sound. Accordingly, by generating and outputting a virtual driving sound to replace an internal combustion engine sound, drivers of the e-ASD-based eco-friendly vehicles may experience the dynamics and fun of driving through virtual driving sounds. Also, pedestrians outside the vehicle may recognize a presence of the vehicle through the virtual driving sounds. The ASD or e-ASD-based virtual driving sounds may be limited to basic virtual driving sounds prepared by a vehicle manufacturer during vehicle production. In order to generate and output a customized virtual driving sound based on a specific sound source desired by a driver, in addition to the basic virtual driving sounds, a driver is required to manually implant (copy) a separate sound source into the vehicle to generate the customized virtual driving sound. In particular, while a driver is driving a vehicle, the driver is required to concentrate on driving. The driver may not implant (copy) a separate sound source directly into the vehicle. Thus, new customized virtual driving sounds may not be generated and output while driving.

SUMMARY

Aspects of the disclosure provides a vehicle and a control method therefor that may generate a customized virtual driving sound based on a specific sound source desired by a driver. In particular, the vehicle and the control method may generate the customized virtual driving sound by automatically receiving the sound source while driving.

Additional aspects of the disclosure are set forth in part in the description that follows and, in part, should be understood from the description or may be learned by practice of the disclosure.

According to an embodiment of the disclosure, a control method for a vehicle may include: receiving a radio signal including a sound source through an antenna of the vehicle; extracting the sound source from the received radio signal; generating a virtual driving sound representing a driving state of the vehicle based on the extracted sound source; and outputting the virtual driving sound to an interior or an exterior of the vehicle.

The radio signal including the sound source may include at least one of a broadcast signal or a communication signal.

The radio signal may include the sound source and an off period provided before the sound source to indicate a start of the sound source.

The radio signal may include the sound source, a header provided before the sound source to indicate information about the sound source, and an off period provided before the header to indicate a start of the sound source.

Generating and outputting the virtual driving sound may include: receiving, by the vehicle, a first sound source from a first radio signal transmitted in a first zone; generating and outputting a first virtual driving sound based on the first sound source; in response to the vehicle exiting the first zone and entering a second zone, receiving, by the vehicle, a second sound source from a second radio signal transmitted in the second zone; and generating and outputting a second virtual driving sound based on the second sound source.

The first radio signal may be transmitted by a first sound source provider of the first zone and may be valid only in the first zone. The second radio signal may be transmitted by a second sound source provider of the second zone and may be valid only in the second zone.

The sound source supplied by transmitting the radio signal may be at least one of a free sound source or a charged sound source based on the sound source being the charged sound source. Payment for the charged sound source may be automatically made through a preset automatic payment method.

The vehicle may include an automatic virtual driving sound generation mode for automatically performing processes from receiving the sound source to outputting the virtual driving sound without driver intervention.

The vehicle may include a virtual driving sound output mode for performing processes from receiving the sound source to outputting the virtual driving sound with driver intervention.

According to an embodiment of the disclosure, a vehicle may include: a broadcast/communication part configured to receive a radio signal including a sound source and extract the sound source from the received radio signal; an acoustic design processor configured to generate a virtual driving sound representing a driving state of the vehicle based on the extracted sound source; and a speaker configured to output the virtual driving sound to an interior or an exterior of the vehicle.

The radio signal including the sound source may include at least one of a broadcast signal or a communication signal.

The radio signal may include the sound source and an off period provided before the sound source to indicate a start of the sound source.

The radio signal may include the sound source, a header provided before the sound source to indicate information about the sound source, and an off period provided before the header to indicate a start of the sound source.

The vehicle may be configured to: receive a first sound source from a first radio signal transmitted in a first zone; generate and output a first virtual driving sound based on the first sound source; in response to the vehicle exiting the first zone and entering a second zone, receive a second sound source from a second radio signal transmitted in the second zone; and generate and output a second virtual driving sound based on the second sound source.

The first radio signal may be transmitted by a first sound source provider of the first zone and may be valid only in the first zone. The second radio signal may be transmitted by a second sound source provider of the second zone and may be valid only in the second zone.

The sound source supplied by transmitting the radio signal may be at least one of a free sound source or a charged sound source based on the sound source being the charged sound source. Payment for the charged sound source may be automatically made through a preset automatic payment method.

The vehicle may include an automatic virtual driving sound generation mode for automatically performing processes from receiving the sound source to outputting the virtual driving sound without driver intervention.

The vehicle may include a virtual driving sound output mode for performing processes from receiving the sound source to outputting the virtual driving sound with driver intervention.

According to another embodiment of the disclosure, a control method for a vehicle may include: receiving a radio signal including a sound source through an antenna of the vehicle; extracting the sound source from the received radio signal; generating a virtual driving sound representing a driving state of the vehicle based on the extracted sound source; and outputting the virtual driving sound to an interior or an exterior of the vehicle. The control method may also include receiving, by the vehicle, a first sound source from a first radio signal transmitted in a first zone, and generating and outputting a first virtual driving sound based on the first sound source. In response to the vehicle exiting the first zone and entering a second zone, the control method may further include receiving, by the vehicle, a second sound source from a second radio signal transmitted in the second zone, and generating and outputting a second virtual driving sound based on the second sound source. The first radio signal may be transmitted by a first sound source provider of the first zone and may be valid only in the first zone. The second radio signal may be transmitted by a second sound source provider of the second zone and may be valid only in the second zone.

BRIEF DESCRIPTION OF THE DRAWINGS

These and/or other aspects of the disclosure should become apparent and more readily appreciated from the following description of embodiments, taken in conjunction with the accompanying drawings of which:

FIG. 2 is a diagram illustrating a control system for generating a customized virtual driving sound of a vehicle according to an embodiment;

FIG. 3 is a diagram illustrating a configuration of a broadcast/communication signal including sound source data according to an embodiment;

FIG. 4 is a flowchart illustrating a control method for a vehicle according to an embodiment;

FIG. 6 is a diagram illustrating an example of an information message for notifying that the use of the sound source is coming to an end;

DETAILED DESCRIPTION

Figure 1:
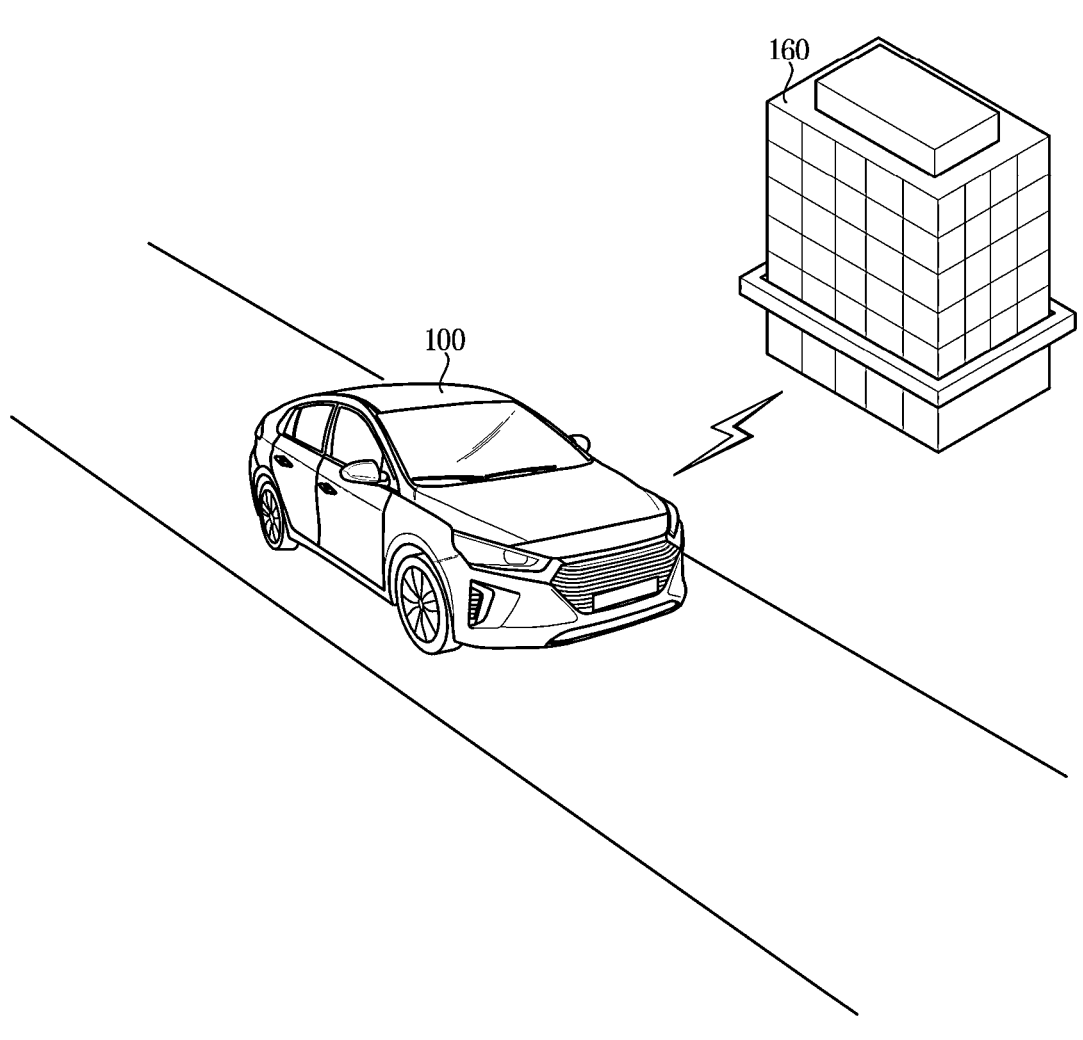
FIG. 1 is a diagram illustrating transmission/reception of a sound source for generating a customized virtual driving sound or a personalized virtual driving sound of a vehicle according to an embodiment.

Like reference numerals throughout the specification denote like elements. Also, this specification does not describe all the elements according to embodiments of the disclosure, and descriptions well-known in the art to which the disclosure pertains or overlapping portions have been omitted. The terms such as "part", "module", and the like may refer to at least one process that is processed by at least one hardware or software component. According to embodiments, a plurality of "parts", "modules" may be embodied as a single element, or a single of a "part", "module" may include a plurality of elements.

It should be understood that, when an element is referred to as being "connected" to another element, the element can be directly or indirectly connected to the other element. The indirect connection includes "connection" via a wireless communication network.

It should be understood that the terms "comprise," "have," and "include," and variations thereof, when used in this specification, specify the presence of stated features, integers, steps, operations, elements, and/or components. Such terms do not preclude the presence or addition of at least one other features, integers, steps, operations, elements, components, and/or groups thereof.

It should be understood that, when it is stated in this specification that a member is located "on" another member, not only may a member be in contact with another member, but also another member may be present between the two members.

It should be understood that, although the terms first, second, and the like, may be used herein to describe various elements, these elements should not be limited by these terms.

It should be understood that the singular forms are intended to include the plural forms as well unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments of the disclosure are described in detail with reference to the accompanying drawings. When a component, device, element, or the like of the present disclosure is described as having a purpose or performing an operation, function, or the like, the component, device, or element should be considered herein as being "configured to" meet that purpose or to perform that operation or function.

FIG. 1 is a diagram illustrating the transmission/reception of a sound source for generating a customized virtual driving sound (or personalized virtual driving sound) of a vehicle according to an embodiment.

As shown in FIG. 1, a vehicle 100 according to an embodiment may receive a broadcast/communication signal transmitted by a sound source provider 160 of an area where the vehicle 100 is located while driving. The sound source provider 160 transmits the broadcast/communication signal including sound source data via a specific preset radio broadcast/communication channel. The vehicle 100 may also receive the broadcast/communication signal including the sound source data via the preset radio broadcast/communication channel.

In an embodiment of the disclosure, a customized virtual driving sound refers to a virtual sound generated based on active sound design (ASD) or electric vehicle active sound design (e-ASD) based on a specific sound source selected by a user and output to an interior or exterior of the vehicle 100. The sound source may be an audio file used to generate the customized driving sound. The sound source data refers to data of a sound source included in the broadcast/communication signal in a modulated form. The sound source may be obtained by extracting and demodulating the sound source data from the broadcast/communication signal.

A radio channel for transmitting/receiving a sound source in the form of a broadcast/communication signal may include any broadcast/communication technologies capable of obtaining (receiving) a sound source through a wireless broadcast/communication means provided in the vehicle 100 without a separate login or connection process for obtaining the sound source in the vehicle 100 while driving. For example, the radio channel may be an analog/digital radio system with specific preset frequencies. Alternatively, the radio channel may be an activated Vehicle to Everything (V2X) system. When using a V2X system, any object (other vehicles, mobile devices, telematics servers, telecommunications operator servers, and the like) performing V2X communications with the vehicle 100 may be the sound source provider 160. A local broadcast station or a registered music provider in a local area may also be the sound source provider 160.

In an embodiment of the disclosure, a sound source for generating a customized virtual driving sound of vehicle may be supplied for a fee or for free. In terms of charged sound sources, payment for the corresponding charged sound source may be made automatically through a preset automatic payment method of the vehicle 100 that has received the corresponding charged sound source.

Figure 2:
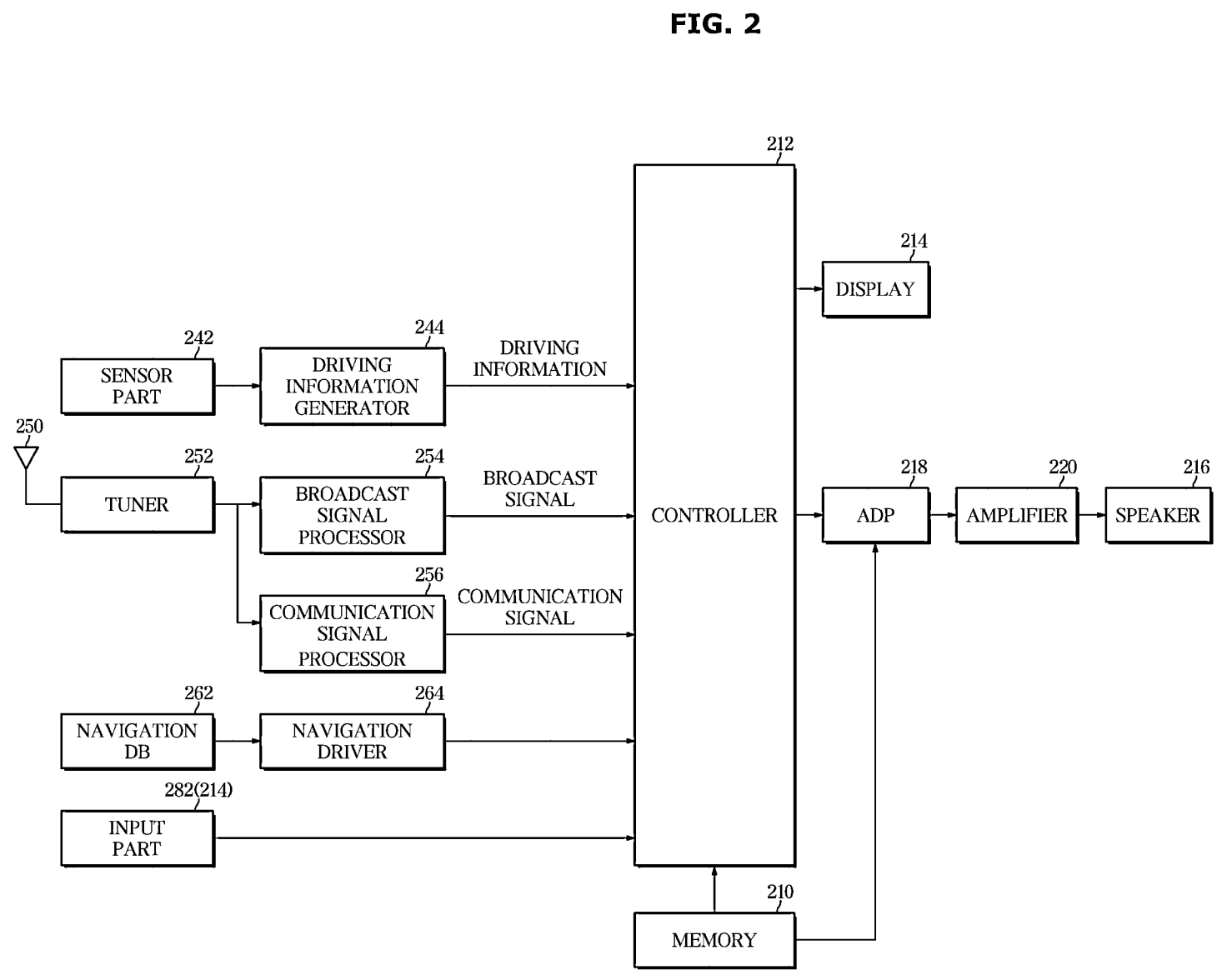

FIG. 2 is a diagram illustrating a control system for generating a customized virtual driving sound of a vehicle according to an embodiment.

A controller 212 is configured to control overall operations of generating a customized virtual driving sound of the vehicle 100 according to an embodiment. The controller 212 may be one of a plurality of electronic control units (ECUs) provided in the vehicle 100.

A sensor part 242 is configured to detect various state values (e.g., driver's intention to accelerate/decelerate, motor torque, vehicle speed, steering angle, shift level, and the like). The sensor part 242 may include an accelerator position sensor (APS) for detecting an operation amount of accelerator pedal. A detection value of the APS may be used to determine a driver's intention to accelerate. Alternatively, the sensor part 242 may include a sensor for detecting an engine speed or motor torque of the vehicle 100. Alternatively, the sensor part 242 may include a steering angle sensor for detecting a steering angle of a steering wheel of the vehicle 100. Alternatively, the sensor part 242 may include a vehicle speed sensor for detecting a speed of the vehicle 100. Alternatively, the sensor part 242 may include a sensor for detecting a shift level of transmission of the vehicle 100. However, sensors included in the sensor part 242 are not limited to the aforementioned sensors, the sensor part 242 may include other sensors for detecting other state values of the vehicle 100 to generate the customized virtual driving sound of the vehicle 100.

Various state values of the vehicle 100 detected through the sensor part 242 are transmitted to a driving information generator 244. The driving information generator 244 generates driving information of the vehicle from the various state values detected through the sensor part 242. The driving information of the vehicle 100 may be at least one of driving speed information, acceleration information, deceleration information, turning information, or stop state information of the vehicle 100. The driving information generated by the driving information generator 244 is not limited to the aforementioned information and may include other driving information required for generating the customized virtual driving sound of the vehicle 100.

An antenna 250 is a device for receiving radio waves in the air to receive a broadcast/communication signal (including sound source data) transmitted by the sound source provider 160. Radio waves may be transmitted to the air through the antenna 250. For example, the antenna 250 may be for receiving a radio broadcast signal or for receiving a V2X signal. The antenna 250 is communicatively connected to a tuner 252 to be described later, so that radio waves (signals) received by the antenna 250 are delivered to the tuner 252. Although the single antenna 250 is shown in FIG. 2, the vehicle 100 according to an embodiment may be equipped with more types of antennas depending on the type of signal to be received or a communication method.

The tuner 252 receives the broadcast/communication signal received by the antenna 250 and only extracts a signal of a specific band from the broadcast/communication signal by conversion to an intermediate frequency signal, or the like. The tuner 252 may obtain sound source data included in the received radio wave through the above extraction from the broadcast signal. The signal of a specific band may be a signal corresponding to sound source data. In order to transmit and receive sound source data for a customized virtual driving sound according to an embodiment, a unique designated frequency only for transmitting and receiving sound sources may avoid overlapping with other frequencies. When an operation mode for generating and outputting the customized virtual driving sound is set in the vehicle 100, the tuner 252 of the vehicle 100 may automatically tune a designated frequency for receiving the sound source data for generating the customized virtual driving sound. By automatically tuning the designated frequency, the vehicle 100 may automatically receive a broadcast/communication signal including sound source data transmitted in a corresponding area while driving.

A broadcast signal processor 254 extracts sound source data from the specific signal extracted by the tuner 252 from the broadcast signal received through the antenna 250. The sound source data extracted by the broadcast signal processor 254 is stored as a sound source in the form of an audio file in a memory 210 under control of the controller 212.

A communication signal processor 256 extracts sound source data from the specific signal extracted by the tuner 252 from the communication signal received through the antenna 250. The sound source data extracted by the communication signal processor 256 is stored as a sound source in the form of an audio file in a memory 210 under control of the controller 212.

The antenna 250, the tuner 252, the broadcast signal processor 254, and the communication signal processor 256 described above may be a broadcast/communication part receiving a radio signal including a sound source and extracting the sound source from the received radio signal.

A navigation database (DB) 262 stores data for implementing navigation. A navigation driver 264 configures a navigation screen on a display 214 using data provided from the navigation database 262. Navigation setting information such as a destination, waypoint, route selection, and the like, set by the driver may be provided from the controller 212.

An input part 282 is a user interface and may be a touch screen implemented on the display 214. Alternatively, the input part 282 may be at least one physical button provided in the vehicle 100 as a user interface. Through the input part 282, a driver may manipulate the user interface required for generating and outputting the customized virtual driving sound in various forms. For example, manipulation of the user interface required for generating and outputting the customized virtual driving sound through the input part 282 may include selecting and activating an automatic customized virtual driving sound generation mode (FIG. 5), application of new virtual driving sound information (FIG. 9), and the like.

An acoustic design processor (ADP) 218 generates the customized virtual driving sound according to an embodiment, by reflecting changes in driving information based on state values (driver's intention to accelerate/decelerate, motor torque, vehicle speed, steering angle, shift level, and the like) of the vehicle 100. The ADP 218 generates the customized virtual driving sound according to an embodiment by using a granular synthesis that generates a new sound by splitting a sound source stored in the memory 210 into extremely small pieces and recombining the split sound. For example, the ADP 218 generates the customized virtual driving sound suited for a driving state of the vehicle 100 by varying the customized virtual driving sound by reflecting current values or changes in vehicle speed, whether the vehicle 100 is accelerating/decelerating, an increase/decrease of motor torque, steering angle, shift level, and the like.

The customized virtual driving sound generated by the ADP 218 is transmitted to an amplifier 220 via an automotive audio bus (A2B). The amplifier 220 amplifies the customized virtual driving sound transmitted from the ADP 218 and delivers to the speaker 216, and the speaker 216 outputs the customized virtual driving sound from the amplifier 220 to an interior or exterior of the vehicle 100.

The controller 212 may be implemented as a memory (not shown) that stores an algorithm for controlling operations of constituent components of the vehicle 100 or data about a program that reproduces the algorithm, and a processor (not shown) that performs the above-described operations using the data stored in the memory. In this instance, the memory and the processor may be provided as one chip, or provided as separate chips.

The broadcast/communication part may include at least one constituent component enabling communication with an external device, for example, at least one of a short-range communication module, wireless communication module, or a wired communication module.

The short-range communication module may include a variety of short-range communication modules that transmit and receive signals in a short distance using a wireless communication network, such as a Bluetooth module, infrared communication module, radio frequency identification (RFID) communication module, wireless local access network (WLAN) communication module, near-field communication (NFC) communication module, Zigbee communication module, and the like.

The wired communication module may include various wired communication modules such as a controller area network (CAN) communication module, local area network (LAN) module, wide area network (WAN) module, value added network (VAN) module, or the like, and also include various cable communication modules such as a universal serial bus (USB), high definition multimedia interface (HDMI), digital visual interface (DVI), recommended standard 232 (RS-232), power line communication, plain old telephone service (POTS), or the like.

The wireless communication module may include wireless communication modules that support a variety of wireless communication methods such as a global system for mobile communication (GSM), code division multiple access (CDMA), wideband CDMA (WCDMA), universal mobile telecommunications system (UMTS), time division multiple access (TDMA), long term evolution (LTE), ultra wideband (UWB), and the like, in addition to a Wifi module and a Wibro module.

The broadcast/communication part may include a wireless communication interface including an antenna and a receiver receiving a radio signal including a sound source. Also, the wireless communication module may further include a signal conversion module demodulating an analog type of radio signal received through the wireless communication interface into a digital control signal.

The memory 210 may be implemented with at least one of a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), and the like, or a recording media such as a hard disk drive (HDD), or a compact disc read only memory (CD-ROM), without being limited thereto. The memory and processor may be integrated into one chip, or provided in physically separated locations.

The display 214 may be provided as a cathode ray tube (CRT), a digital light processing (DLP) panel, a plasma display panel (PDP), liquid crystal display (LCD) panel, electro luminescence (EL) panel, electrophoretic display (EPD) panel, electrochromic display (ECD) panel, light emitting diode (LED) panel, organic LED (OLED) panel, and the like, without being limited thereto.

The input part 282 may include a hardware device such as various buttons or switches, a pedal, a keyboard, a mouse, a track-ball, various levers, a handle, a stick, and the like.

Also, the input part 282 may include a graphical user interface (GUI) such as a touch pad, i.e., a software device. The touch pad may be implemented as a touch screen panel (TSP) and form a mutual layer structure with a display.

When implemented as a TSP forming a mutual layer structure with a touch pad, the display may be used as the input part.

At least one constituent component may be added or omitted corresponding to the performance of the constituent components of the vehicle 100 illustrated in FIG. 2. Also, it should be understood by those of ordinary skill in the art that mutual positions of the constituent components may be modified corresponding to the performance or structure of the constituent components.

Each of the constituent components shown in FIG. 2 refers to a software, and/or a hardware component such as a field-programmable gate array (FPGA) or an application-specific integrated circuit (ASIC).

FIG. 3 is a diagram illustrating a configuration of a broadcast/communication signal including sound source data according to an embodiment. When the sound source provider 160 transmits sound source data through a broadcast/communication signal having a configuration shown in FIG. 3, the vehicle 100 according to an embodiment may receive the broadcast/communication signal and generate a customized virtual driving sound.

In a configuration 302 of the broadcast/communication signal in FIG. 3, sound source data with a length of approximately one second is repeated and an off period is set between the repeated sound source data, thus the tuner 252 of the vehicle 100 receiving the broadcast/communication signal may distinguish a start and an end of the sound source data.

In another configuration 304 of the broadcast/communication signal in FIG. 3, actual sound source data with a length of approximately one second is repeated, an off period is set between the repeated sound source data, and a header is further inserted before each sound source data. Information such as a name, length, and the like, of the sound source may be recorded in the header. The configuration 304 of the broadcast/communication signal including the header shown in FIG. 3 is applicable in regions where digital broadcasting is provided, such as North America, Europe, and India.

FIG. 4 is a flowchart illustrating a control method of a vehicle according to an embodiment. In the control method of a vehicle of FIG. 4, operations of obtaining sound source data through 'automatic reception' of broadcast/communication signals and generating and outputting a customized virtual driving sound through sound processing of the obtained sound data.

As shown in FIG. 4, a driver of the vehicle 100 may set an automatic customized virtual driving sound generation mode of the vehicle 100 (402). In the automatic customized virtual driving sound generation mode, reception of a broadcast/communication signal, and generation and output of customized virtual driving sound may be automatically performed in the vehicle 100 without driver intervention. According to the control method of FIG. 4, in the automatic customized virtual driving sound generation mode, the following operations are 'automatically' performed without driver intervention. A virtual driving sound is generated based on a separate sound source obtained from outside the vehicle 100, not a sound source preset in the vehicle. The generated virtual driving sound is output to an interior or exterior of the vehicle 100. A broadcast/communication signal (including sound source data) transmitted through a preset designated frequency is received while the automatic customized virtual driving sound generation mode is activated. A customized virtual driving sound is generated in the ADP 218 using the received sound source data. The generated customized virtual driving sound is output through the amplifier 220 and the speaker 216.

Figure 5:
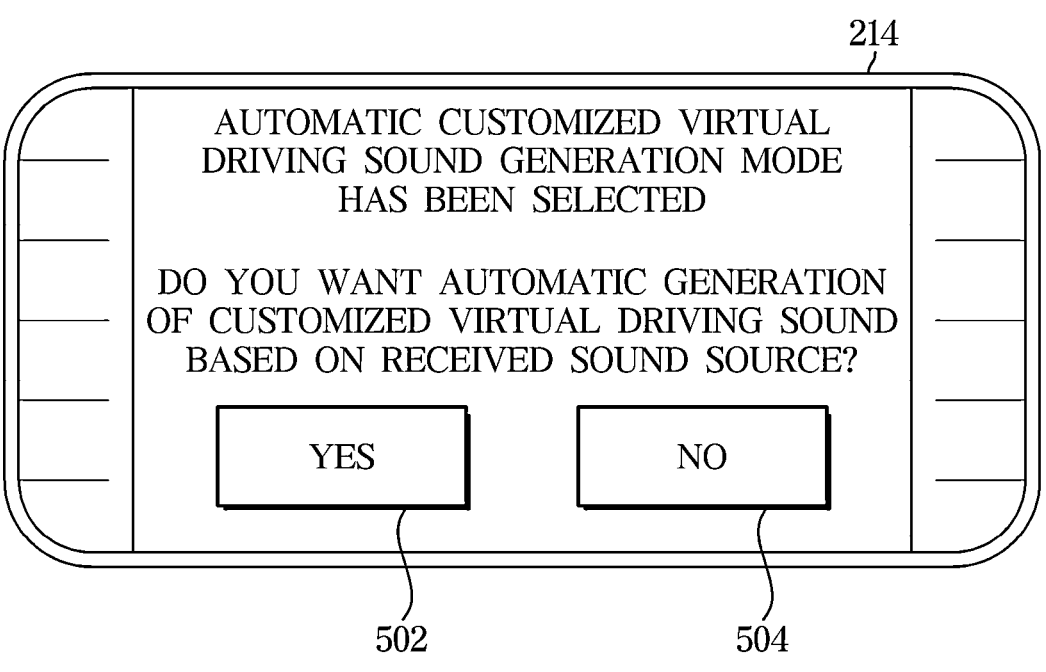
FIG. 5 is a diagram illustrating an information message displayed on a display when a driver selects an automatic customized virtual driving sound generation mode.

FIG. 5 is a diagram illustrating an information message displayed on a display when a driver selects an automatic customized virtual driving sound generation mode. The controller 212 outputs an information message shown in FIG. 5 through the display 214, allowing a driver to confirm that the automatic customized virtual driving sound generation mode has been selected. In addition, a "yes" box 502 shown in FIG. 5 is displayed on the display 214 to allow the driver to tap to confirm the selection of the automatic customized virtual driving sound generation mode. When the driver taps a "no" box 504 on the display 214 in FIG. 5, the selection of the automatic customized virtual driving sound generation mode is canceled.

Referring again to FIG. 4, when the selection of the automatic customized virtual driving sound generation mode is confirmed, the controller 212 may receive a broadcast/communication signal of a designated specific frequency through the antenna 250 and the tuner 252 (404). The designated specific frequency is for transmitting and receiving sound source data to be used in generating a customized virtual driving sound. When the automatic customized virtual driving sound generation mode is activated, a specific frequency may be automatically tuned in the tuner 252, and a signal of the selected specific frequency may be received through the antenna 250.

When a broadcast/communication signal of the corresponding frequency is received through the antenna 250 according to the automatic tuning by the tuner 252, the controller 212 confirms whether a magnitude (e.g., an electric field strength) of the currently received broadcast/communication signal is greater than or equal to a preset reference value (406). When the vehicle 100 is located outside a reception range of a broadcast/communication signal in a specific area, the signal may not be stably received, because the magnitude of the broadcast/communication signal received through the corresponding frequency is relatively small. Accordingly, only a broadcast/communication signal having a preset magnitude (electric field strength) or higher is received as a broadcast/communication signal including valid sound source data.

When the magnitude of the currently received broadcast/communication signal is greater than or equal to the preset reference value (Yes in operation 406), the controller 212 recognizes the received broadcast/communication signal as a broadcast/communication signal including valid sound source data and obtains (records or stores) the sound source data included in the broadcast/communication signal (410). The processes of extracting the sound source data from the broadcast/communication signal received through the antenna 250 and obtaining as a sound source have been described above with reference to FIG. 2 in relation to the tuner 252, the broadcast signal processor 254, the communication signal processor 256, and the memory 210. In other words, the broadcast signal processor 254 or the communication signal processor 256 only extracts a signal of a specific band from the broadcast/communication signal received through the antenna 250 and the tuner 252 to obtain the sound source data. The obtained sound source data is stored as a sound source in the form of an audio file in the memory 210 under control of the controller 212.

The controller 212 controls the ADP 218 to generate a new customized virtual driving sound to which the sound source obtained (recorded or stored) in the memory 210 is applied (412). In other words, in response to the control of the controller 212, the ADP 218 generates the new customized virtual driving sound considering various driving information of the vehicle 100 (e.g., at least one of driving speed information, acceleration information, deceleration information, turning information, or stop state information of the vehicle 100). The ADP 218 may use a granular synthesis that generates a new sound by splitting a sound source stored in the memory 210 into extremely small pieces and recombining the split sound.

The customized virtual driving sound generated by the ADP 218 is amplified by the amplifier 220 and then output to an interior or exterior of the vehicle 100 through the speaker 216 (414). The driver may experience the dynamics of driving or fun of driving through the customized virtual driving sound output to the interior of the vehicle 100. Furthermore, a pedestrian outside the vehicle 100 may be aware of presence of the vehicle 100 through the customized virtual driving sound output to the outside of the vehicle 100.

While the automatic customized virtual driving sound generation mode of the vehicle 100 is activated, the controller 212 continuously monitors the magnitude of the broadcast/communication signal received through the antenna 250 to confirm whether the magnitude of the broadcast/communication signal decreases below the preset threshold value (416). As described above with respect to operation 406, in an embodiment, a broadcast/communication signal is recognized as a broadcast/communication signal including valid sound source data only when the magnitude of the broadcast/communication signal received through a specific frequency is equal to or greater than a preset magnitude. Thus, it is required to continuously monitor whether the magnitude of the broadcast/communication signal received decreases below the preset threshold value.

When the magnitude of the received broadcast/communication signal decreases below the preset threshold (Yes in operation 416), the controller 212 stops outputting the customized virtual driving sound currently being output and deletes the corresponding sound source stored in the memory 210 (418). When the vehicle 100 or the driver has permanent ownership of the sound source, the sound source may continue to be stored in the memory 210 without being deleted.

When the magnitude of the received broadcast/communication signal decreases below the preset threshold, the controller 212 may determine that the vehicle 100 is out of a service area for the sound source. In this case, an information message may be displayed on the display 214 to notify that the use of the sound source is coming to an end. FIG. 6 is a diagram illustrating an example of an information message to notify that use of a sound source is coming to an end. As shown in FIG. 6, the controller 212 determines that the vehicle 100 is out of a service area of a corresponding sound source based on a magnitude of a broadcast/communication signal below the preset threshold value, and displays the information message as shown in FIG. 6 on the display 214 so that the driver is able to recognize that the output of the customized virtual driving sound currently being output in the vehicle 100 will be stopped and the sound source will be deleted.

Figure 7:
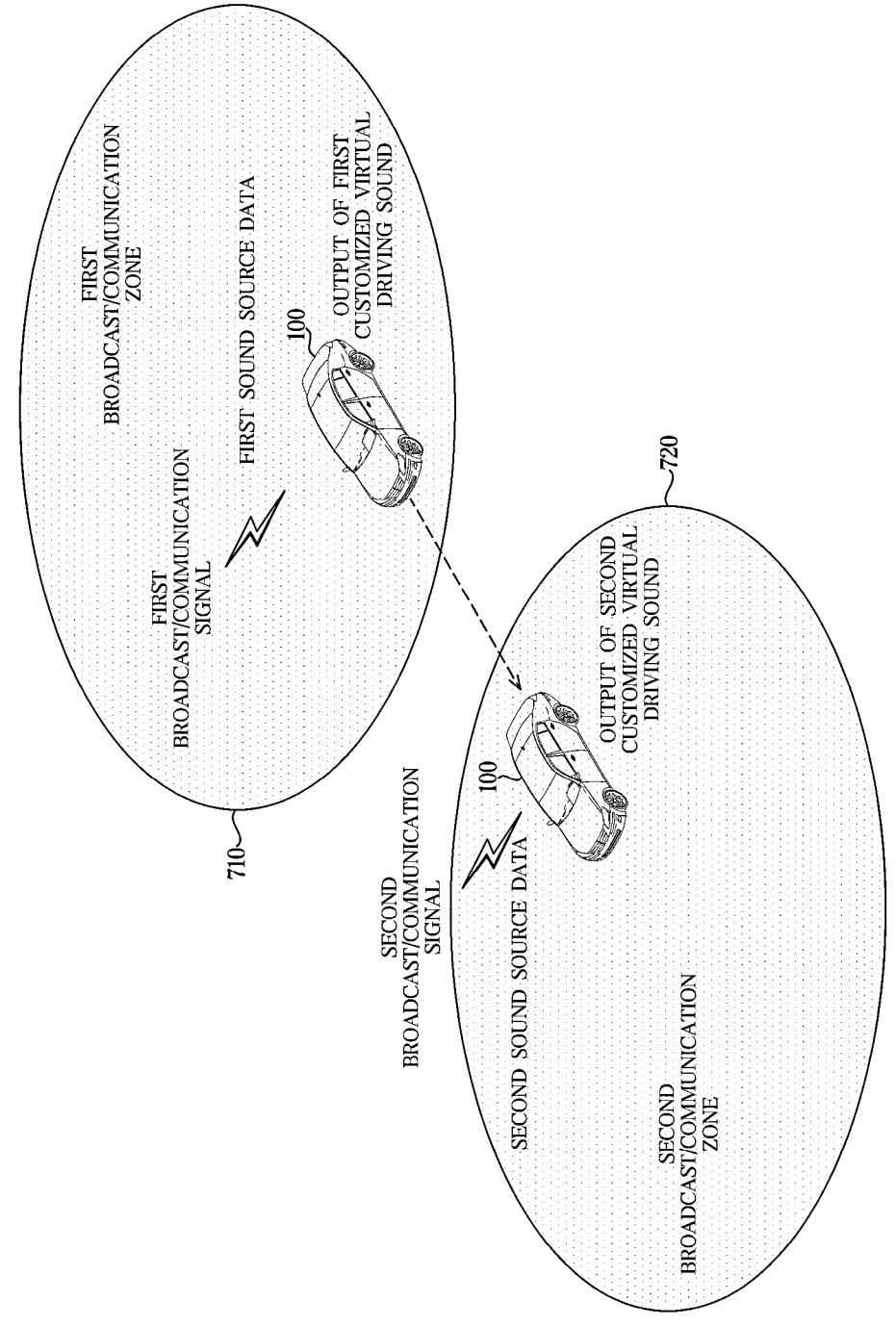
FIG. 7 is a diagram illustrating a change of customized virtual driving sound due to a change in sound source while driving a vehicle according to an embodiment.

FIG. 7 is a diagram illustrating a change of customized virtual driving sound due to a change in sound source while driving a vehicle according to an embodiment.

As shown in FIG. 7, while driving through a first broadcast/communication zone 710, the vehicle 100 may receive first sound source data via a radio channel from the sound source provider 160 of the first broadcast/communication zone 710, extract a first sound source from the first sound source data, and generate and output a first customized virtual driving sound based on the extracted first sound source.

When the vehicle 100 exits the first broadcast/communication zone 710, the output of the customized virtual driving sound stops, along with the output of the information message described above with reference to FIG. 6, and the corresponding sound source (the sound source of the first sound source data) is deleted.

When the vehicle 100 exits the first broadcast/communication zone 710 and enters a second broadcast/communication zone 720, the vehicle 100 may: receive second sound source data via a radio channel from the sound source provider 160 of the second broadcast/communication zone 720; extract a second sound source from the second sound source data; and generate and output a second customized virtual driving sound based on the extracted second sound source. When the vehicle 100 exits the second broadcast/communication zone 720 and enters another new broadcast/communication zone, the output of the current customized virtual driving sound may be stopped through the same process described above. A new customized virtual driving sound may be output based on a new sound source of the other new broadcast/communication zone.

For example, in a vicinity of Gyeongbokgung Palace in Seoul, the capital city of South Korea, sound data with a theme of playing gayageum, a traditional Korean musical instrument, may be supplied. The vehicle 100 driving near Gyeongbokgung Palace in Seoul may receive sound data of a gayageum from the sound source provider 160 in Seoul and generate and output a customized virtual driving sound with a motif of a gayageum performance.

As another example, in the Scotland region, the sound source provider 160 in the Scotland region may provide sound data of a bagpipe playing motif. The vehicle 100 traveling in the Scotland region may receive sound data of bagpipes from the sound source provider 160 and generate and output a customized virtual driving sound with the motif of bagpipe performance.

Furthermore, a city near the ocean may generate and output customized virtual driving sounds that mimic the sound of waves. Alternatively, around a zoo, the vehicle may generate and output customized virtual driving sounds that mimic the sounds or calls of animals.

Figure 8:
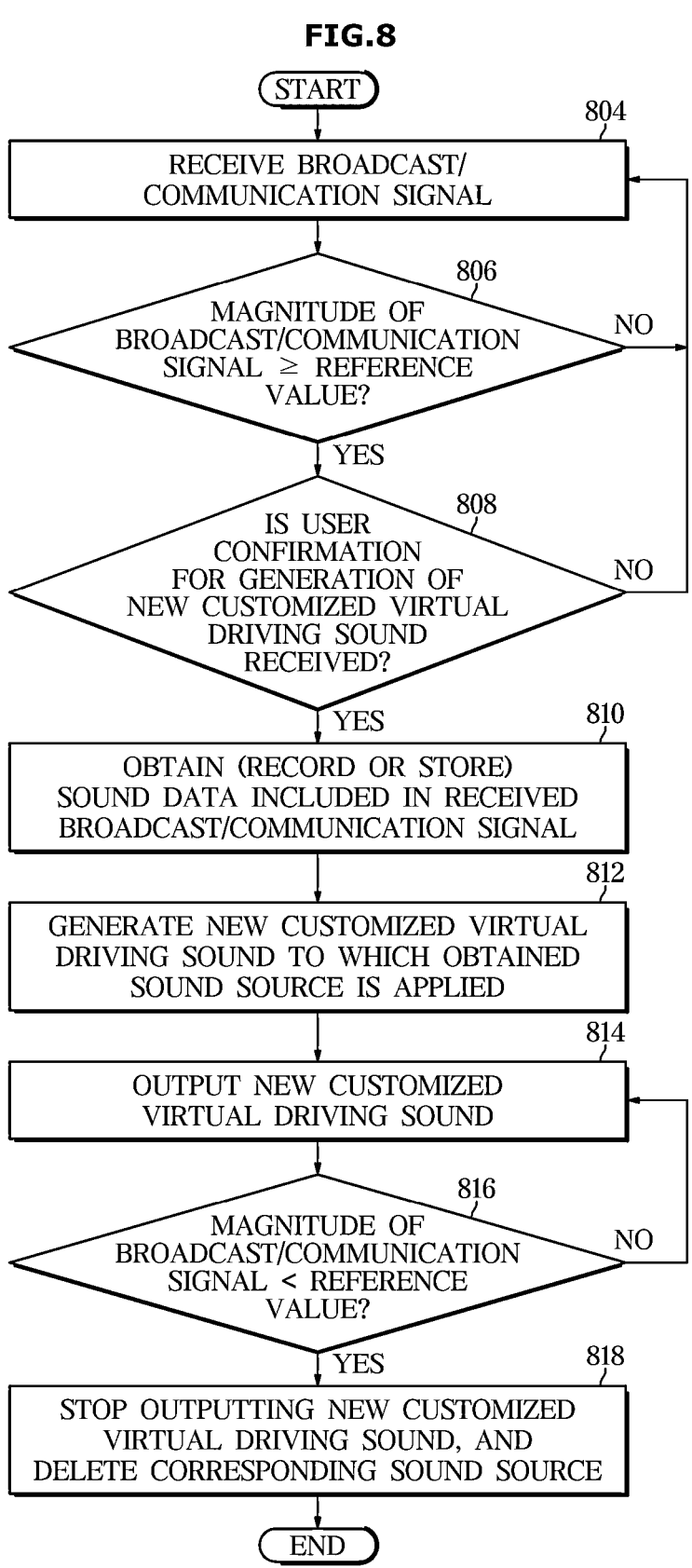
FIG. 8 is a flowchart illustrating a control method of a vehicle according to another embodiment.

FIG. 8 is a flowchart illustrating a control method for a vehicle according to another embodiment. In the control method according to another embodiment, when the vehicle 100, with a customized virtual driving sound output mode activated, receives a nearby broadcast/communication signal, the vehicle 100 obtains sound data 'through driver's confirmation' and generates and outputs a customized virtual driving sound through sound processing of the obtained sound data. In the customized virtual driving sound output mode of FIG. 8, the virtual driving sound is generated and output to an interior or exterior of the vehicle 100 based on a separate sound source obtained from outside the vehicle 100 rather than a sound source preset in the vehicle 100. This may include a plurality of confirmation processes to confirm the driver's intention during the process.

While the customized virtual driving sound output mode of the vehicle 100 is activated, the controller 212 may receive a broadcast/communication signal of a designated specific frequency through the antenna 250 and the tuner 252 (804). The designated specific frequency is for transmitting and receiving sound source data to be used in generating a customized virtual driving sound. When the customized virtual driving sound output mode is activated, the tuner 252 may automatically tune the specified frequency, and a signal of the specified frequency may be received through the antenna 250.

When a broadcast/communication signal of the corresponding frequency is received through the antenna 250 according to the automatic tuning by the tuner 252, the controller 212 confirms whether a magnitude (e.g., an electric field strength) of the currently received broadcast/communication signal is greater than or equal to a preset reference value (806). When the vehicle 100 is located outside a reception range of broadcast/communication signal in a specific area, the signal may not be stably received, because the magnitude of the broadcast/communication signal received through the corresponding frequency is relatively small. Accordingly, only a broadcast/communication signal having a preset magnitude (electric field strength) or higher is received as a broadcast/communication signal including valid sound source data.

When the magnitude of the currently received broadcast/communication signal is greater than or equal to the preset threshold value (Yes in operation 806), the controller 212 recognizes the received broadcast/communication signal as a broadcast/communication signal including valid sound source data and performs driver confirmation (user confirmation) of generation and output of a new customized virtual driving sound (808).

Figure 9:
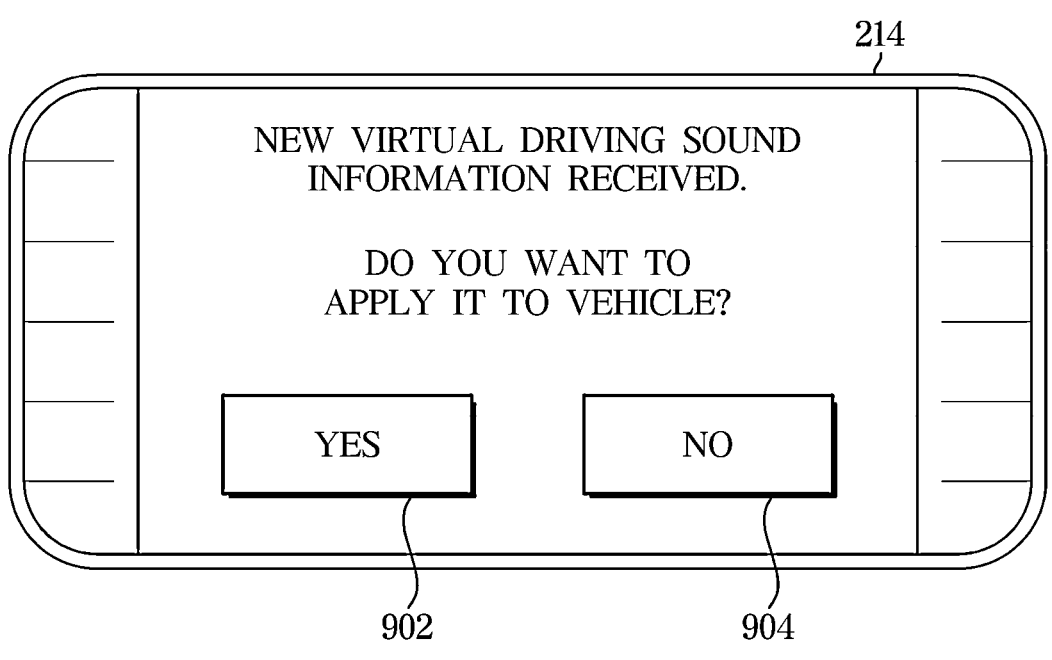
FIG. 9 is a diagram illustrating an information message for a user to confirm generation and output of new customized virtual driving sound.

FIG. 9 is a diagram illustrating an information message for a user to confirm generation and output of a new customized virtual driving sound. As shown in FIG. 9, new customized virtual driving sound information (i.e., new sound source data) has been received, thus the controller 212 inquires about the application of the new customized virtual driving sound information and receives confirmation from a driver (user). The driver may allow the new virtual drive sound information to be applied to the vehicle 100 by tapping a "Yes" box 902 displayed on the display 214. Alternatively, the driver may tap the "No" box 904 displayed on the display 214 to not apply the new virtual driving sound information to the vehicle 100.

Figure 10:
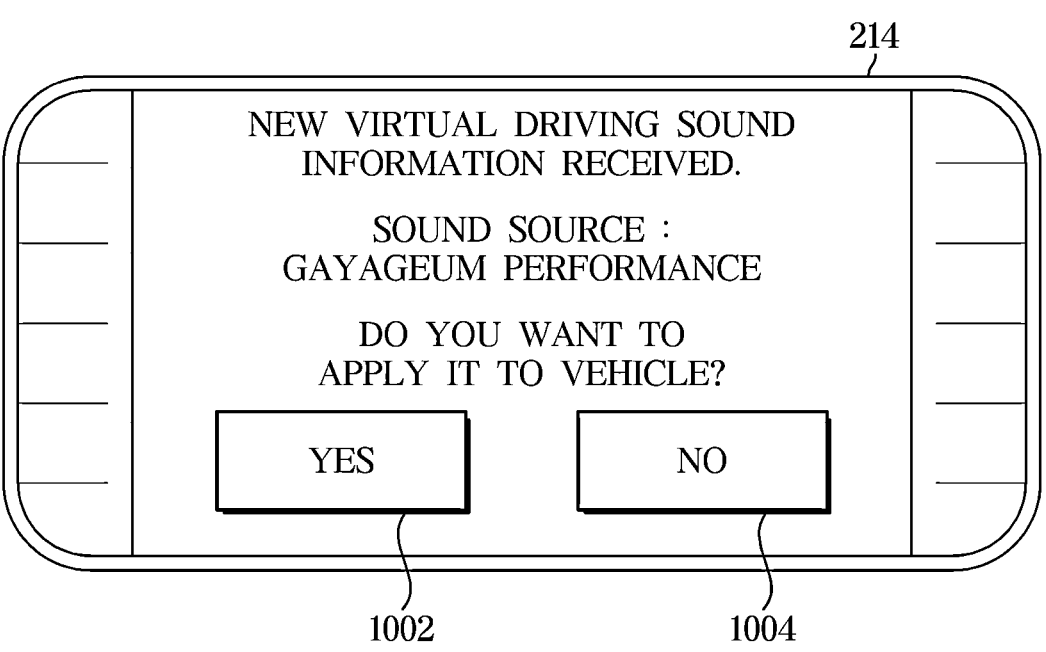
FIG. 10 is a diagram illustrating another information message for a user to confirm generation and output of new customized virtual driving sound.

FIG. 10 is a diagram illustrating another information message for a user to confirm generation and output of new customized virtual driving sound. As shown in FIG. 10, new customized virtual driving sound information (i.e., new sound source data) has been received, thus the controller 212 inquires about application of the new customized virtual driving sound information and receives confirmation from a driver (user). Specifically, in FIG. 10, information about what the new virtual driving sound information received is may be additionally provided. For example, as shown in FIG. 10, an information message may be displayed to notify that a currently available sound source is a sound of a gayageum, a traditional Korean musical instrument. The driver may tap a "Yes" box 1002 displayed on the display 214 to allow the new virtual driving sound information to be applied to the vehicle 100. Alternatively, the driver may tap a "No" box 1004 displayed on the display 214 to not apply the new virtual driving sound information to the vehicle 100.

Referring again to FIG. 8, when the user confirmation for the generation and output of the new customized virtual driving sound is received (Yes in operation 808), the controller 212 obtains (records or stores) sound data included in the corresponding broadcast/communication signal received through the antenna 250 (810). The processes of extracting the sound source data from the broadcast/communication signal received through the antenna 250 and obtaining as a sound source have been described above in relation to the antenna 250, the tuner 252, the broadcast signal processor

254, the communication signal processor 256, and the memory 210 with reference to FIG. 2. In other words, the broadcast signal processor 254 or the communication signal processor 256 only extracts a signal of a specific band from the broadcast/communication signal received through the antenna 250 and the tuner 252 to obtain the sound source data. The obtained sound source data is stored as a sound source in the form of an audio file in the memory 210 under control of the controller 212.

The controller 212 controls the ADP 218 to generate a new customized virtual driving sound to which the sound source obtained (recorded or stored) in the memory 210 is applied (812). In other words, in response to the control of the controller 212, the ADP 218 generates the new customized virtual driving sound considering various driving information of the vehicle 100 (e.g., at least one of driving speed information, acceleration information, deceleration information, turning information, or stop state information of the vehicle 100). The ADP 218 may use a granular synthesis that generates a new sound by splitting a sound source stored in the memory 210 into extremely small pieces and recombining the split sound.

The customized virtual driving sound generated by the ADP 218 is amplified by the amplifier 220 and then output to an interior or exterior of the vehicle 100 through the speaker 216 (814). The driver may experience the dynamics of driving or fun of driving through the customized virtual driving sound output to the interior of the vehicle 100. Furthermore, a pedestrian outside the vehicle 100 may be aware of presence of the vehicle 100 through the customized virtual driving sound output to the outside of the vehicle 100.

While the automatic customized virtual driving sound generation mode of the vehicle 100 is activated, the controller 212 continuously monitors the magnitude of the broadcast/communication signal received through the antenna 250 to confirm whether a magnitude of the broadcast/communication signal decreases below a preset threshold value (816). As described above with respect to operation 806, in an a broadcast/communication signal is recognized as a embodiment, broadcast/communication signal including valid sound source data only when the magnitude of the broadcast/communication signal received through a specific frequency is equal to or greater than a preset magnitude. Thus, it is required to continuously monitor whether the magnitude of the broadcast/communication signal received decreases below the preset threshold value.

When the magnitude of the received broadcast/communication signal decreases below the preset threshold (Yes in operation 816), the controller 212 stops outputting the customized virtual driving sound currently being output and deletes the corresponding sound source stored in the memory 210 (818). When the vehicle 100 or driver has permanent ownership of the sound source, the sound source may continue to be stored in the memory 210 without being deleted.

When the magnitude of the received broadcast/communication signal decreases below the preset threshold, the controller 212 may determine that the vehicle 100 is out of a service area for the sound source. In this case, an information message may be displayed on the display 214 to notify that the use of the sound source is coming to an end. In other words, as described with reference to FIG. 6, the controller 212 determines that the vehicle 100 is out of the service area of the sound source based on the magnitude of the broadcast/communication signal below the preset threshold value and displays the information message as shown in FIG. 6 on the display 214. Thus, the driver is able to recognize that the output of the customized virtual driving sound currently being output in the vehicle 100 will be stopped and the sound source will be deleted.

The above-described embodiments can be stored in the form of a recording medium, such as a non-transitory medium, storing computer-executable instructions. The instructions may be stored in the form of a program code, and when executed by a processor, the instructions may perform operations of the disclosed embodiments. The recording medium may be implemented as a computer-readable recording medium.

The computer-readable recording medium includes all kinds of recording media in which instructions that may be decoded by a computer are stored of, for example, a read only memory (ROM), random access memory (RAM), magnetic tapes, magnetic disks, flash memories, optical recording medium, and the like.

As is apparent from the above, according to embodiments of the disclosure, a customized virtual driving sound can be generated based on a specific sound source desired by a driver. In particular, the customized virtual driving sound can be generated by automatically receiving the sound source while driving to improve driver convenience.

A sound source reflecting characteristics of a region can be provided in the form of radio signals within the region, thereby effectively highlighting or promoting the characteristics of the region to drivers of vehicles passing through the region.

In addition, sound source providers can sell sound sources reflecting the characteristics of each region for a fee, creating a revenue-generating model.

Although embodiments have been described for illustrative purposes, those having ordinary skill in the art should appreciate that various modifications, additions and substitutions are possible, without departing from the scope and spirit of the disclosure. Therefore, embodiments have not been described for limiting purposes.

What is claimed is:

1. A control method for a vehicle, the control method comprising:
  receiving a radio signal including a sound source through an antenna of the vehicle;
  determining whether a strength of the received radio signal is equal to or greater than a preset threshold value;
  extracting the sound source from the received radio signal based on the signal strength being equal to or greater than the preset threshold value;
  generating a virtual driving sound representing a driving state of the vehicle based on the extracted sound source; and
  outputting the virtual driving sound to an interior or an exterior of the vehicle,
  wherein when the strength of the received radio signal is less than the preset threshold value, the sound source is deleted without generating the virtual driving sound.

2. The control method of claim 1, wherein the radio signal further includes at least one of a broadcast signal or a communication signal.

3. The control method of claim 2, wherein the radio signal further includes an off period provided before the sound source to indicate a start of the sound source.

4. The control method of claim 2, wherein the radio signal further includes:
  a header provided before the sound source to indicate information about the sound source; and an off period provided before the header to indicate a start of the sound source.

5. The control method of claim 1, wherein generating and outputting of the virtual driving sound include:
  receiving, by the vehicle, a first sound source from a first radio signal transmitted in a first zone;
  generating and outputting a first virtual driving sound based on the first sound source;
  in response to the vehicle exiting the first zone and entering a second zone, receiving, by the vehicle, a second sound source from a second radio signal transmitted in the second zone; and
  generating and outputting a second virtual driving sound based on the second sound source.

6. The control method of claim 5, wherein:
  the first radio signal is transmitted by a first sound source provider of the first zone and is valid only in the first zone; and
  the second radio signal is transmitted by a second sound source provider of the second zone and is valid only in the second zone.

7. The control method of claim 1, wherein:
  the sound source supplied by transmitting the radio signal is at least one of a free sound source or a charged sound source; and
  based on the sound source being the charged sound source, payment for the charged sound source is automatically made through a preset automatic payment method.

8. The control method of claim 1, wherein the vehicle includes an automatic virtual driving sound generation mode for automatically performing processes from receiving the sound source to outputting the virtual driving sound without driver intervention.

9. The control method of claim 1, wherein the vehicle includes a virtual driving sound output mode for performing processes from receiving the sound source to outputting the virtual driving sound with driver intervention.

10. A vehicle, comprising:
  a broadcast/communication part configured to receive a radio signal including a sound source;
  an acoustic design processor configured to determine whether a strength of the received radio signal is equal to or greater than a preset threshold value, extract the sound source from the radio signal based on the signal strength being equal to or greater than the preset threshold value, and generate a virtual driving sound representing a driving state of the vehicle based on the extracted sound source, wherein when the strength of the received radio signal is less than the preset threshold value, the sound source is deleted without generating the virtual driving sound; and
  a speaker configured to output the virtual driving sound to an interior or an exterior of the vehicle.

11. The vehicle of claim 10, wherein the radio signal further includes at least one of a broadcast signal or a communication signal.

12. The vehicle of claim 11, wherein the radio signal further includes an off period provided before the sound source to indicate a start of the sound source.

13. The vehicle of claim 11, wherein the radio signal further includes:
  a header provided before the sound source to indicate information about the sound source; and
  an off period provided before the header to indicate a start of the sound source.

14. The vehicle of claim 10, wherein the vehicle is configured to:

receive a first sound source from a first radio signal transmitted in a first zone;

generate and output a first virtual driving sound based on the first sound source;

in response to the vehicle exiting the first zone and entering a second zone, receive a second sound source from a second radio signal transmitted in the second zone; and generate and output a second virtual driving sound based on the second sound source.

15. The vehicle of claim 14, wherein:

the first radio signal is transmitted by a first sound source provider of the first zone and is valid only in the first zone; and the second radio signal is transmitted by a second sound source provider of the second zone and is valid only in the second zone.

16. The vehicle of claim 10, wherein:

the sound source supplied by transmitting the radio signal is at least one of a free sound source or a charged sound source; and based on the sound source being the charged sound source, payment for the charged sound source is automatically made through a preset automatic payment method.

17. The vehicle of claim 10, wherein the vehicle includes an automatic virtual driving sound generation mode for automatically performing processes from receiving the sound source to outputting the virtual driving sound without driver intervention.

18. The vehicle of claim 10, wherein the vehicle includes a virtual driving sound output mode for performing processes from receiving the sound source to outputting the virtual driving sound with driver intervention.

19. A control method for a vehicle, the control method comprising:

receiving a radio signal including a sound source through an antenna of the vehicle;

extracting the sound source from the received radio signal;

generating a virtual driving sound representing a driving state of the vehicle based on the extracted sound source;

outputting the virtual driving sound to an interior or an exterior of the vehicle;

receiving, by the vehicle, a first sound source from a first radio signal transmitted in a first zone;

generating and outputting a first virtual driving sound based on the first sound source;

in response to the vehicle exiting the first zone and entering a second zone, receiving, by the vehicle, a second sound source from a second radio signal transmitted in the second zone; and generating and outputting a second virtual driving sound based on the second sound source, wherein the first radio signal is transmitted by a first sound source provider of the first zone and is valid only in the first zone, and wherein the second radio signal is transmitted by a second sound source provider of the second zone and is valid only in the second zone.

\* \* \* \* \*